United States Patent
Gupta et al.

(10) Patent No.: US 11,475,395 B2
(45) Date of Patent: Oct. 18, 2022

(54) SYSTEMS AND METHODS FOR COMBINATORIAL RESOURCE OPTIMIZATION

(71) Applicant: Walmart Apollo, LLC, Bentonville, AR (US)

(72) Inventors: Anurag Gupta, Palo Alto, CA (US); Mingang Fu, Palo Alto, CA (US); Srinivasan Venkatesan, San Jose, CA (US); Deepak Deshpande, San Jose, CA (US); Amritayan Nayak, Santa Clara, CA (US); Rohit Jain, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 188 days.

(21) Appl. No.: 15/876,007

(22) Filed: Jan. 19, 2018

(65) Prior Publication Data
US 2019/0228376 A1 Jul. 25, 2019

(51) Int. Cl.
*G06Q 10/08* (2012.01)
*G01C 21/34* (2006.01)
(Continued)

(52) U.S. Cl.
CPC ... *G06Q 10/08355* (2013.01); *G01C 21/3407* (2013.01); *H04W 4/024* (2018.02); *H04W 4/029* (2018.02); *H04W 4/44* (2018.02)

(58) Field of Classification Search
CPC .......... G06Q 10/08355; G06Q 10/109; H04W 4/024; H04W 4/029; H04W 4/44; G01C 21/3407
See application file for complete search history.

(56) References Cited

U.S. PATENT DOCUMENTS 6,701,299 B2 * 3/2004 Kraisser ............. G06Q 10/0631
705/330
6,754,634 B1 6/2004 Ho
(Continued)

FOREIGN PATENT DOCUMENTS

| JP | 2007017192 A | * | 1/2007 | |
| WO | WO-0169488 A1 | * | 9/2001 | ........... G06Q 10/047 |
| WO | WO-2017062492 A1 | * | 4/2017 | ............. G06N 5/003 |

OTHER PUBLICATIONS

"Solving Combinatorial Optimization Problems Using Genetic Algorithms and Ant Colony Optimization," by Gautham Puttur Rajappa, Aug. 2012 (Year: 2012).*

(Continued)

*Primary Examiner* — Jeff Zimmerman
*Assistant Examiner* — Brian Adams Heflin
(74) *Attorney, Agent, or Firm* — Duane Morris LLP; Manita Rawat (57) ABSTRACT

Systems and methods for optimizing delivery vehicle resources (e.g. a plurality of vehicles) are described herein. Available time slots for the plurality of vehicles are determined and presented to a user. In response to receiving a delivery order indicating a selected time slot, the delivery order is assigned to a vehicle from the plurality of vehicles based on a time slot indicated in the delivery order and a set of delivery parameters. A delivery route is calculated for each vehicle having a delivery order based on the set of delivery parameters. An optimized delivery route is calculated for each vehicle having a delivery order based on the set of delivery parameters.

17 Claims, 8 Drawing Sheets

(51) Int. Cl.
*H04W 4/44* (2018.01)
*H04W 4/029* (2018.01)
*H04W 4/024* (2018.01)

(56) References Cited

U.S. PATENT DOCUMENTS

| | | | |
|---|---|---|---|
| 7,222,081 B1* | 5/2007 | Sone | G06Q 10/08 705/333 |
| 7,251,612 B1 | 7/2007 | Parker et al. | |
| 7,437,305 B1 | 10/2008 | Kantarjiev et al. | |
| 8,429,019 B1 | 4/2013 | Yeatts et al. | |
| 9,857,188 B1* | 1/2018 | O'Hare | G01C 21/3626 |
| 10,255,577 B1 | 4/2019 | Steves et al. | |
| 10,839,695 B2 | 11/2020 | Kuncl et al. | |
| 10,846,633 B2 | 11/2020 | Magazinik et al. | |
| 2001/0047285 A1 | 11/2001 | Borders et al. | |
| 2002/0007299 A1 | 1/2002 | Florence | |
| 2002/0147654 A1 | 10/2002 | Kraisser et al. | |
| 2004/0107110 A1* | 6/2004 | Gottlieb | G06Q 10/047 705/6 |
| 2005/0278063 A1* | 12/2005 | Hersh | G06Q 10/06311 700/216 |
| 2006/0161335 A1* | 7/2006 | Beinhaker | G01C 21/343 701/532 |
| 2009/0254405 A1 | 10/2009 | Hollis | |
| 2009/0296990 A1 | 12/2009 | Holland et al. | |
| 2010/0235210 A1 | 9/2010 | Nadrotowicz, Jr. | |
| 2011/0112761 A1 | 5/2011 | Hurley et al. | |
| 2011/0161964 A1 | 6/2011 | Piazza et al. | |
| 2012/0253892 A1 | 10/2012 | Davidson | |
| 2013/0325553 A1 | 12/2013 | Nadiadi et al. | |
| 2014/0244110 A1 | 8/2014 | Tharaldson et al. | |
| 2014/0330739 A1 | 11/2014 | Falcone et al. | |
| 2015/0081360 A1* | 3/2015 | Sun | G06Q 50/28 705/7.13 |
| 2015/0120600 A1* | 4/2015 | Luwang | G06Q 10/08355 705/338 |
| 2015/0178678 A1* | 6/2015 | Carr | G06Q 10/0838 705/341 |
| 2016/0042321 A1 | 2/2016 | Held | |
| 2016/0071056 A1* | 3/2016 | Ellison | G06Q 10/08355 705/338 |
| 2016/0210591 A1* | 7/2016 | Lafrance | G06F 16/29 |
| 2016/0379167 A1 | 12/2016 | Raman | |
| 2017/0059337 A1 | 3/2017 | Barker et al. | |
| 2017/0154347 A1 | 6/2017 | Bateman et al. | |
| 2017/0178070 A1 | 6/2017 | Wang et al. | |
| 2017/0193574 A1* | 7/2017 | Marueli | G07B 15/02 |
| 2017/0228683 A1 | 8/2017 | Hu et al. | |
| 2018/0158020 A1 | 6/2018 | Khasis | |
| 2018/0283890 A1* | 10/2018 | Zhao | G01C 21/3697 |
| 2018/0315319 A1 | 11/2018 | Spector et al. | |
| 2019/0114588 A1* | 4/2019 | Radetzki | G06Q 10/08355 |
| 2019/0197475 A1 | 6/2019 | Bianconcini et al. | |
| 2019/0266557 A1 | 8/2019 | Berk et al. | |
| 2019/0266690 A1 | 8/2019 | Mandeno et al. | |
| 2020/0134557 A1 | 4/2020 | Pevzner et al. | |
| 2021/0150467 A1 | 5/2021 | Sakai et al. | |

OTHER PUBLICATIONS

"Time Slot Management in Attended Home Delivery," by Niels Agatz, Ann Campbell, Mortiz Fleischmann, and Martin Savelsbergh, Apr. 15, 2008 (Year: 2008).*

"Solving multi depot vehicle routing problem for Iowa recycled paper by Tabu Search heuristic," by Supachai Pathumnakul, 1996 (Year: 1996).*

Mahajan Manoj, "Backward and Forward Scheduling" Jun. 30, 2018, 2 pages.

Xu, Jianliang,"Client-Side Data Caching in Mobile Computing Environments", Hong Kong University of Science and Technology, Jun. 2002.

Xu, "Client-Side Data Catching In Mobile Computing Environments", University of Science and Technology, Jun. 2002, 176 pages total.

"Coincide," Merriam-Webster, Nov. 2, 2016 (Year: 2016).

"Determining time windows in urban freight transport: A city cooperative approach," by Derya Eren Akyol, Rene B.M, and De Koster, Department of Department of Industrial Engineering, Dokus Eylul University, Jul. 12, 2018 (Year 2018).

Agatz, et al., "Time Slot Management in Attended Home Delivery" Apr. 15, 2008, 32 pages.

* cited by examiner

SYSTEMS AND METHODS FOR COMBINATORIAL RESOURCE OPTIMIZATION

TECHNICAL FIELD

This application relates generally to combinatorial resource optimization, and more particularly, relates to optimizing delivery routes in a goods delivery system.

BACKGROUND

At least some known systems and industries provide delivery services to their customers. For example, some industries provide the delivery of goods, such as grocery items, to their customers, which has increasingly become a method by which consumers obtain their grocery needs. For grocery delivery services, the use of delivery vehicle resources can be optimized in order to achieve an efficient and profitable grocery delivery service. One particular optimization solution or system is resource optimization and vehicle routing (ROVR), which is designed to optimize grocery delivery routes based on a number of factors in order to make efficient use of delivery vehicle resources.

However, current solutions, including ROVR cannot scale to handle large order sizes (e.g., 2000 or more orders per day). As the number of delivery orders increases, the combinatorial space to be explored (i.e., the complexity of the optimization problem) increases exponentially. For example, doubling the number of orders may result in an exponential increase in the number of alternative delivery routes that are explored and/or considered. In addition, computational resources become bottlenecked, as the time required to optimize delivery routes increases once the number of orders becomes larger. For example, a single optimization can take longer than three minutes, which may significantly affect an optimization system's ability to allocate computation resources to other stores among a collection of hundreds of stores.

SUMMARY OF THE INVENTION

The embodiments described herein enable the optimization of vehicle resources during delivery of goods, such as grocery items. For example, in one embodiment, a system for optimizing vehicle resources during delivery of goods is disclosed. The system may include a computing device configured to communicate with a vehicle server, wherein the vehicle server is configured to communicatively couple to a plurality of vehicles. The computing device may be configured to receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The computing device may be configured to receive, from the at least one user terminal, at least one delivery order indicating at least one selected time slot from the at least one available time slot. In response to receiving the at least one delivery order indicating the at least one selected time slot, the computing device may further be configured to assign the delivery order to a vehicle from the plurality of vehicles based, at least in part, on the selected time indicated in the at least one delivery order and at least one parameter for each of the plurality of vehicles. The computing device may be configured to calculate, for the assigned vehicle, an optimized delivery route based, at least in part, on the at least one delivery parameter and transmit the optimized delivery route to the assigned vehicle.

In other embodiments, a method for optimizing vehicle resources during delivery of goods is disclosed. Time data of a plurality of vehicles may be received from a vehicle server, wherein the time data includes a plurality of time slots for each of the plurality of vehicles that are used for a plurality of deliveries and at least one available time slot among the plurality of time slots is determined and communicated to at least one user terminal. At least one delivery order indicating at least one selected time slot may be received from the user terminal. In response to receiving the at least one delivery order indicating the at least one selected time slot, the delivery order may be assigned to a vehicle from the plurality of vehicles based, at least in part, on the selected time indicated in the at least one delivery order and at least one parameter for each of the plurality of vehicles. An optimized delivery route for the assigned vehicle may be calculated, based, at least in part, on the at least one delivery parameter and transmitted to the assigned vehicle.

In yet other embodiments, a non-transitory computer readable medium is disclosed, having instructions stored thereon for optimizing vehicle resources during delivery of goods. The instructions, when executed by a processor, cause a device to perform operations for such optimization. The device may communicate with a vehicle server, wherein the vehicle server is configured to communicatively couple to a plurality of vehicles. The device may receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The device receive, from the at least one user terminal, at least one delivery order indicating at least one selected time slot from the at least one available time slot. In response to receiving the at least one delivery order indicating the at least one selected time slot, the device may assign the delivery order to a vehicle from the plurality of vehicles based, at least in part, on the selected time indicated in the at least one delivery order and at least one parameter for each of the plurality of vehicles. The device may calculate, for the assigned vehicle, an optimized delivery route based, at least in part, on the at least one delivery parameter and transmit the optimized delivery route to the assigned vehicle.

DETAILED DESCRIPTION

As discussed above, existing solutions or systems for resource optimization cannot scale to handle large numbers of orders and do not enable sufficient flexibility with computational resources. The embodiments described herein facilitate the efficient optimization of resources in large-scale delivery systems. The embodiments described herein include, for example, the estimation of a number of available time windows for a delivery, and the presenting of available time windows to a user. The embodiments also include the determination of delivery routes for one or more vehicles and the subsequent optimization of the determined delivery routes. Although the embodiments described herein illustrate delivery resource optimization systems and methods used for the delivery of grocery goods or items, the embodiments discussed herein are not limited to such systems and methods and one of ordinary skill in the art will appreciate that the current disclosure may be used in connection with any type of system or method that addresses various different types of combinatorial optimization problems.

Figure 1A:
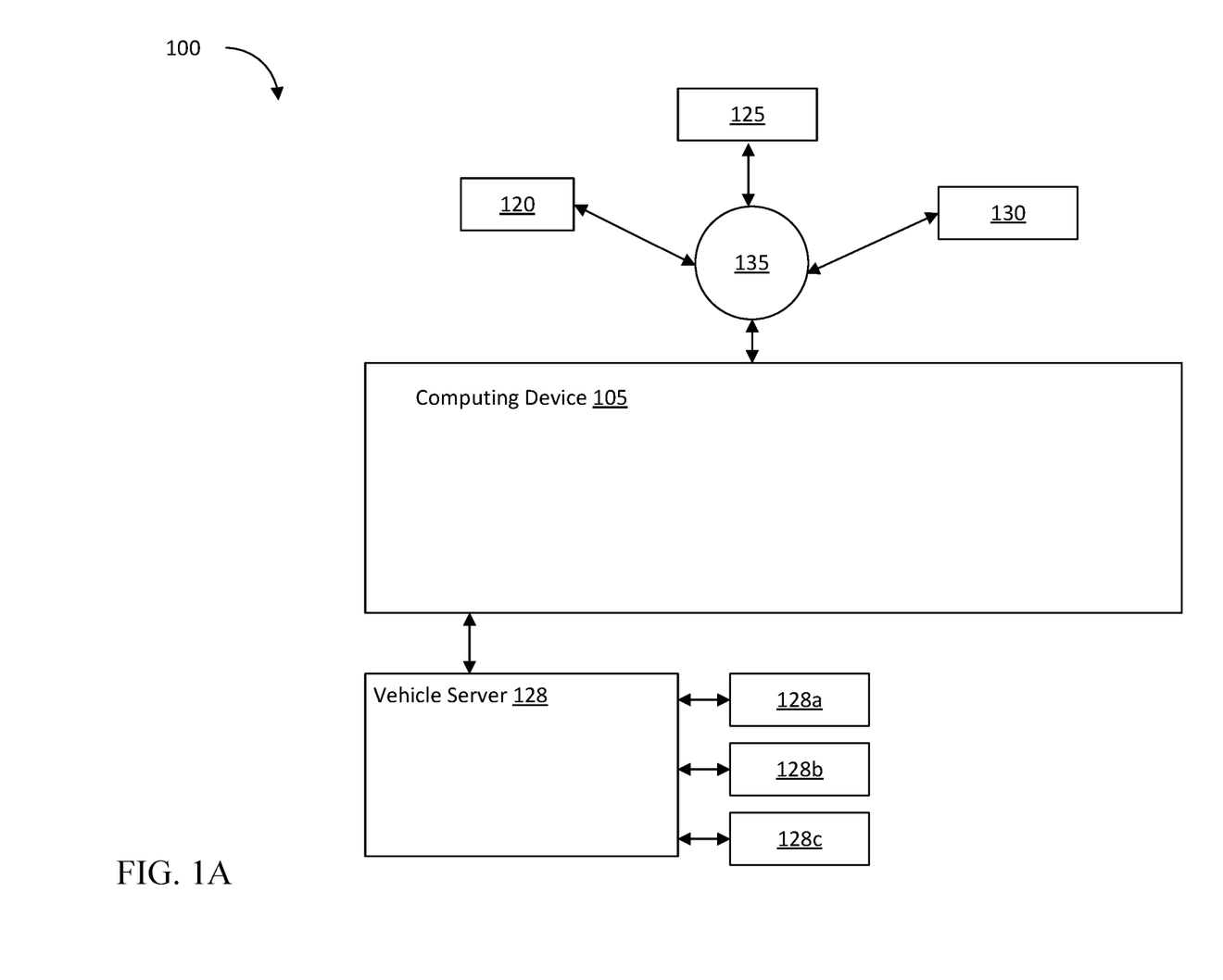
FIG. 1A illustrates an exemplary system in accordance with some embodiments of the present disclosure.

FIG. 1A illustrates a system 100 in accordance with exemplary embodiments of the present disclosure. System 100 may be utilized, for example, in optimizing the use of a plurality of vehicles (not shown) in delivering groceries to users. System 100 may include a server 105, one or more user terminals, such as terminals 120, 125, and 130, and a vehicle server 128, that are each coupled to server 105. System 100 may further include vehicles 128a-c which are each communicatively coupled to vehicle server 128 and may receive delivery order assignments and delivery routes from server 105 via the vehicle server 128. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces.

Server 105, user terminals 120, 125, and 130, and vehicle server 128 can each be a computing device that can be, for example, a desktop computer, laptop, mobile device, tablet, thin client, or other device having a communications interface (not shown) that can communicate with other components of system 100, as explained in more detail below with respect to FIG. 1B.

In some embodiments, server 105 can be associated with, for example, a retail store, such as a grocery store. For example, server 105 can include information about the grocery items that are available from the retail store. For example, server 105 can maintain a database (such as database 160 shown in FIG. 1B) that includes details on the various grocery items available from the retail store, the quantity of each item available from the retail store, the price of each item, and (if applicable) an amount of time before a particular grocery item will perish after leaving the store (e.g. milk or fresh fruits). As will be discussed in further detail with respect to FIG. 2, server 105 may also maintain a database of vehicle availability which it may use to determine available time slots from the plurality of vehicles for presentation to a user (e.g. via user terminals 120, 125, and 130).

In some embodiments, vehicle server 128 may enable communication between server 105 and each of the vehicles 128a-c. For example, as server 105 determines delivery order assignments and delivery routes (as discussed in more detail below), server 105 may communicate these assignments and routes to vehicle server 128, which may in turn communicate the assignments and routes to the corresponding vehicle. Vehicle server 128 may also transmit to server 105, information regarding the plurality of time slots each of the vehicles in the plurality of vehicles has. For example, vehicle server 128 may transmit information regarding the number of time slots a vehicle has per delivery route, the length of each time slot, and other pertinent information regarding the plurality of time slots each vehicle has. In some embodiments, the functions of the vehicle server 128 may be performed by server 105.

In some embodiments, each user terminal 120, 125, and 130, can be accessed by a user to enable the user to communicate with server 105. For example, each user terminal 120, 125, and 130 can be capable of connecting to, for example, the internet and communicating with server 105 via network 135. The user can use terminals 120, 125, and 130 for accessing information from server 105. For example, the user can obtain information, such as the grocery items that are available for purchase and available delivery time slots, as discussed in more detail herein.

During operation, as explained in more detail below with respect to FIGS. 1A, 2, 3A, 3B, 4A, 4B, and 5, system 100 can be used to facilitate the efficient delivery of goods, such as grocery items. For example, server 105 may receive delivery orders from user terminals 120-130 via network 135. Such orders may be received from a variety of locations. As discussed above, although discussed in terms of grocery delivery, the embodiments described herein may be utilized to solve any combinatorial optimization problem. Upon receiving a delivery order from any of user terminals 120-130, server 105 may assign the delivery order to an appropriate vehicle among the plurality of vehicles 128a-c and determine an appropriate delivery route for that vehicle based on one or more delivery parameters. Server 105 may transmit the assignment and route information to the appropriate delivery vehicle via vehicle server 128.

Figure 1B:
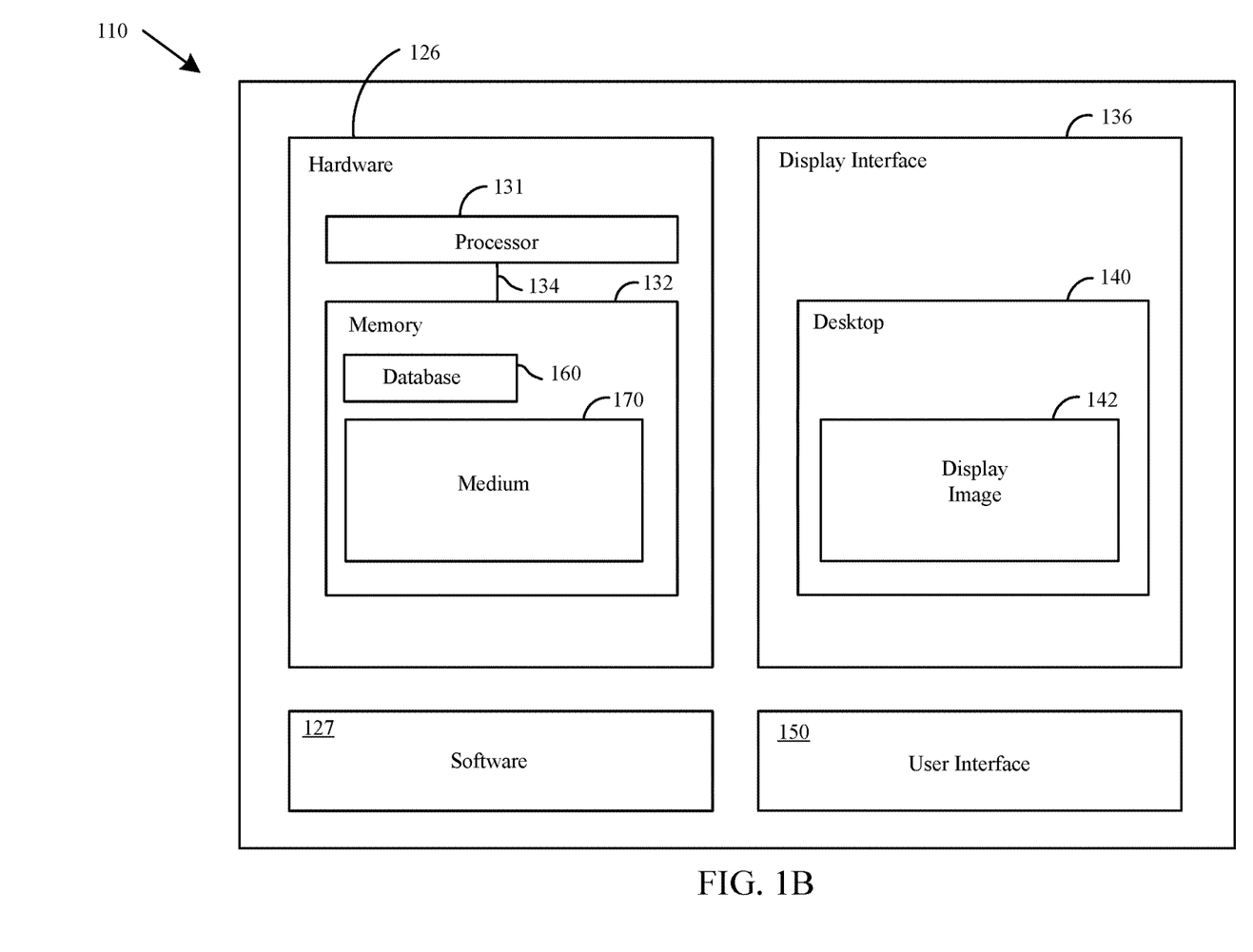
FIG. 1B illustrates an exemplary computing device that may be used with the system shown in FIG. 1A, in accordance with some embodiments of the present disclosure.

FIG. 1B is a block diagram of an exemplary computing device 110, which may be used to implement one or more of server 105, user terminals 120, 125, and 130, and vehicle server 128 (shown in FIG. 1A). In some embodiments, computing device 110 includes a hardware unit 126 and software 127. Software 127 can run on hardware unit 126 such that various applications or programs can be executed on hardware unit 126 by way of software 127. In some embodiments, the functions of software 127 can be implemented directly in hardware unit 126, e.g., as a system-on-a-chip, firmware, field-programmable gate array ("FPGA"), etc. In some embodiments, hardware unit 126 includes one or more processors, such as processor 131. In some embodiments, processor 131 is an execution unit, or "core," on a microprocessor chip. In some embodiments, processor 131 may include a processing unit, such as, without limitation, an integrated circuit ("IC"), an ASIC, a microcomputer, a programmable logic controller ("PLC"), and/or any other programmable circuit. Alternatively, processor 131 may include multiple processing units (e.g., in a multi-core configuration). The above examples are exemplary only, and, thus, are not intended to limit in any way the definition and/or meaning of the term "processor."

Hardware unit 126 also includes a system memory 132 that is coupled to processor 131 via a system bus 234. Memory 132 can be a general volatile RAM. For example, hardware unit 126 can include a 32 bit microcomputer with 2 Mbit ROM and 64 Kbit RAM, and/or a few GB of RAM. Memory 132 can also be a ROM, a network interface (MC), and/or other device(s).

In some embodiments, computing device 110 can also include at least one media output component or display interface 136 for use in presenting information to a user. Display interface 136 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 110 can output at least one desktop, such as desktop 140. Desktop 140 can be an interactive user environment provided by an operating system and/or applications running within computing device 110, and can include at least one screen or display image, such as display image 142. Desktop 140 can also accept input from a user in the form of device inputs, such as keyboard and mouse inputs. In some embodiments, desktop 140 can also accept simulated inputs, such as simulated keyboard and mouse inputs. In addition to user input and/or output, desktop 140 can send and receive device data, such as input and/or output for a FLASH memory device local to the user, or to a local printer.

In some embodiments, display image 142 can be presented to a user on computer displays of a remote terminal (not shown). For example, computing device 110 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 110 and the remote terminals or the servers, such that remote end users can access the information from computing device 110.

In some embodiments, computing device 110 includes an input or a user interface 150 for receiving input from a user. User interface 150 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 110, in some embodiments, can include a database 160 within memory 132, such that various information can be stored within database 160. Alternatively, in some embodiments, database 160 can be included within a remote server (not shown) with file sharing capabilities, such that database 160 can be accessed by computing device 110 and/or remote end users. In some embodiments, a plurality of computer-executable instructions can be stored in memory 132, such as one or more computer-readable storage media 170 (only one being shown in FIG. 1B). Computer storage medium 170 includes non-transitory media and may include volatile and nonvolatile, removable and non-removable mediums implemented in any method or technology for storage of information such as computer-readable instructions, data structures, program modules or other data. The instructions may be executed by processor 131 to perform various functions described herein, e.g., steps of the method shown in FIG. 5.

Figure 1C:
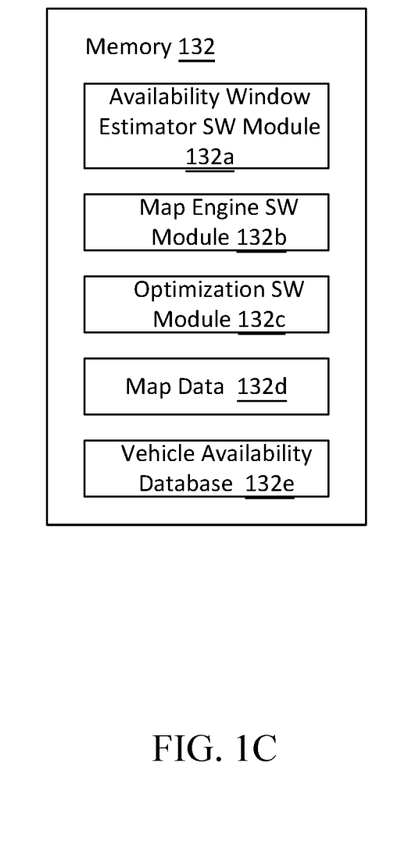
FIG. 1C illustrates an exemplary memory for storing instructions for executing steps of a method that may be used with the system shown in FIG. 1A, in accordance with some embodiments of the present disclosure.

FIG. 1C illustrates an example of computer-executable instructions that can be stored in memory 132 as software (SW) modules. Memory 132 may include the following SW modules: (1) an availability window estimator SW module 132a that is configured to determine a number of available time slots for delivery of groceries; (2); a map engine SW module 132b that is configured to assign delivery orders to vehicles and determine the sequence in which a particular vehicles orders will be delivered (delivery route); (3) an optimization SW module 132c that is configured to optimize the delivery route for each vehicle having at least one delivery order assigned to it.

Memory 132 may further store map data 132d of the geographic area serviced by one or more store fronts as well as a vehicle availability database 132e that stores a snapshot of the current capacity of each vehicle in the plurality of vehicles and the time slots each vehicle has available.

Referring back to FIG. 1A, in some embodiments, server 105 may determine and present a number of available delivery time slots to a user. More specifically, server 105 may generate a synthetic order and compare the synthetic order to a snap shot of the plurality of vehicles (as described below with respect to FIG. 2) retrieved from vehicle availability database 132e (shown in FIG. 1C). Server 105 may maintain the snap shot based on information received from vehicle server 128 regarding the plurality of time slots each vehicle in the plurality of vehicles has. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. At this point, server 105 may identify the time slots having at least one of the plurality of vehicles available for delivery during that time slot as acceptable delivery time slots and communicate those time slots to the user via user terminals 120-130.

Figure 2:
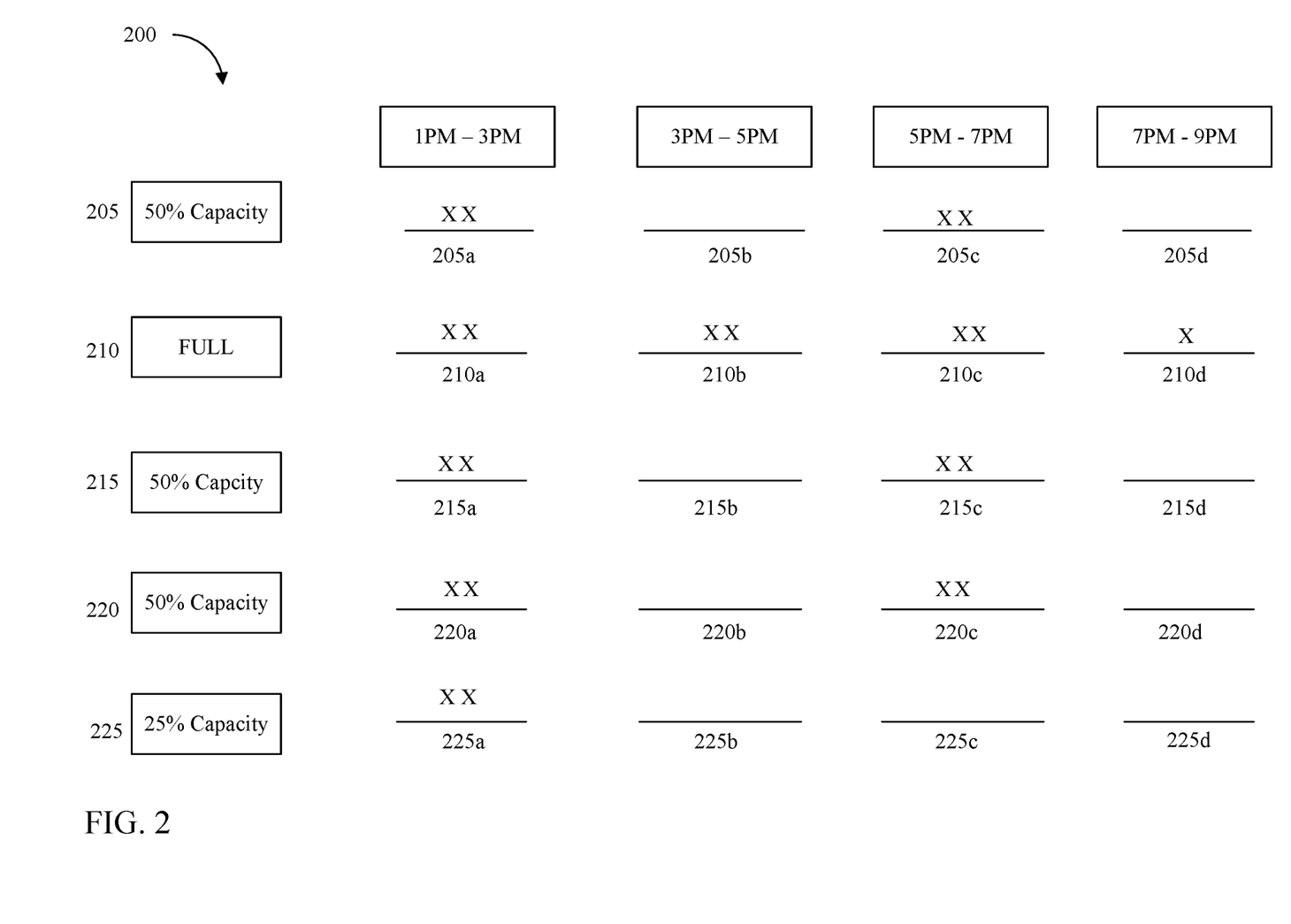
FIG. 2 illustrates an exemplary diagram of vehicle availability that may be used with the system shown in FIG. 1A, in accordance with some embodiments of the present disclosure.

FIG. 2 illustrates a snapshot 200 of the time slot availability of a plurality of vehicles. Snapshot 200 may be updated at the end of an optimization process (as discussed in further detail below) and stored in vehicle availability database 132e (shown in FIG. 1C). Each vehicle 205, 210, 215, and 220 may have 4 available time slots (ranging from 1 PM to 9 PM). It should be noted that time slots of any appropriate length may be used. As discussed above, the number of time slots each vehicle has, as well as the length of each time slot may be determined based on information transmitted from each vehicle 128a-c via vehicle server 128. As shown in FIG. 2, vehicle 205 has time slots 205a-d while vehicle 210 has time slots 210a-d etc. In the example of FIG. 2, vehicle 210 may not have any capacity, thus server 105 may refrain from assigning any further delivery orders to it. In addition, none of the vehicles 205-225 may have availability in the 1 PM-3 PM time slot, while only vehicle 225 has availability in the 5 PM-7 PM time slot, corresponding to time slot 225c. Thus, in the example of FIG. 2, server 105 may present three time slots (3 PM-5 PM, 5 PM-7 PM, and 7 PM-9 PM) to a customer wishing to place a delivery order.

Referring back to FIG. 1A, upon receiving a delivery order indicating a delivery address and a selected time slot, server 105 may determine a delivery route for one or more vehicles in the plurality of vehicles. More specifically, server 105 may determine which vehicle the received delivery order is to be assigned to, whether certain delivery orders need to be re-assigned to a different vehicle in order to optimize vehicle resources, and the sequence in which each vehicle's assigned delivery orders will be delivered. Server 105 may assign the received delivery order to, and determine a delivery route for a vehicle from the plurality based on the selected time slot of the received order, map data 115d, and an overall cost that is a function of a number of delivery parameters. In some embodiments, server 105 may also re-assign delivery orders to, and determine delivery routes for other vehicles in the plurality of vehicles based on the selected time slot of the received order, map data 115d, and an overall cost that is a function of a number of delivery parameters. Examples of such delivery parameters may include number of vehicles from the plurality needed to deliver all orders, total number of miles driven by the vehicles during delivery, total driving time of the vehicles during delivery, total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

Figure 3A:
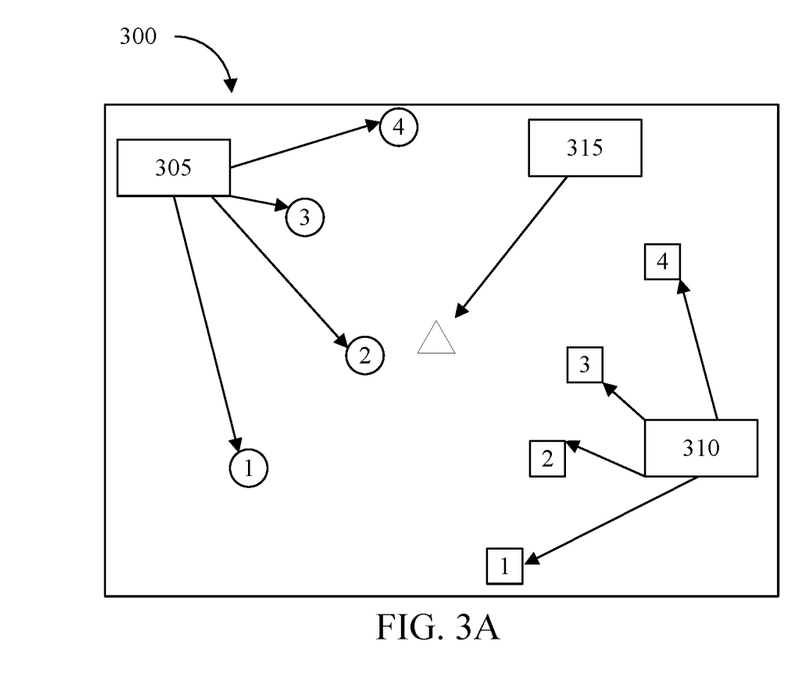
FIG. 3A illustrates an exemplary diagram of a route map for one or more delivery vehicles prior to assigning a delivery route or option that may be used with the system shown in FIG. 1A, in accordance with some embodiments of the present disclosure.
Figure 3B:
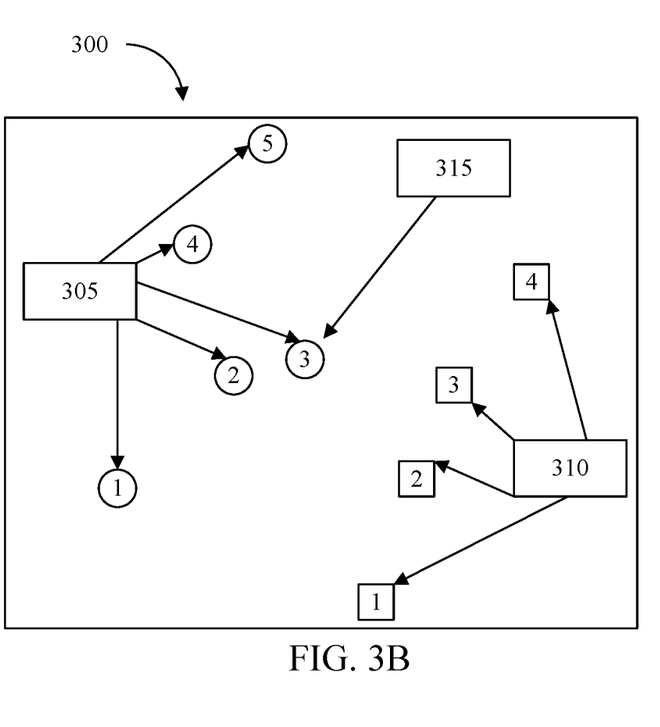
FIG. 3B illustrates an exemplary diagram of the route map for one or more delivery vehicles after assigning the delivery route that may be used with the system shown in FIG. 1A, in accordance with some embodiments of the present disclosure.

FIG. 3A illustrates a delivery route map 300 for a first and second delivery vehicle in accordance with some embodiments of the present disclosure. Delivery route 305 may indicate the delivery route of the first vehicle, while delivery route 310 may indicate the delivery route of the second vehicle. Delivery order 315 may indicate the delivery address of a delivery order that is yet to be assigned to a particular vehicle. As an initial matter, server 105 may determine that assigning delivery order 315 to the first delivery vehicle for delivery in the same time slot as delivery number 2 will not prevent the first delivery vehicle from completing any of its subsequent deliveries on time. Server 105 may make a similar determination with respect to assigning delivery order 315 to the second delivery vehicle for delivery in the time slot for its delivery number 2. In addition, server 105 may determine that the delivery address of delivery order 315 is in close proximity to the delivery address of delivery number two for the first delivery vehicle and is also relatively far from any of the delivery addresses in the second vehicles delivery route 310. Thus, server 105 may determine that the total number of miles required to be driven will be minimized if delivery order 315 is assigned to the first delivery vehicle for delivery after delivery number 2. Server 105 may also determine that the number of miles driven can be further reduced if the first delivery vehicle delivers delivery order 315 after its current delivery number two (as delivery number two is on the way). Therefore, server 105 may assign delivery order 315 to the first delivery vehicle, and sequence it for delivery right after delivery number 2. FIG. 3B illustrates the new delivery route for the first delivery vehicle.

In some embodiments, server 105 may further optimize each vehicle's delivery route. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order. Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process to further optimize each vehicle's delivery route.

Figure 4A:
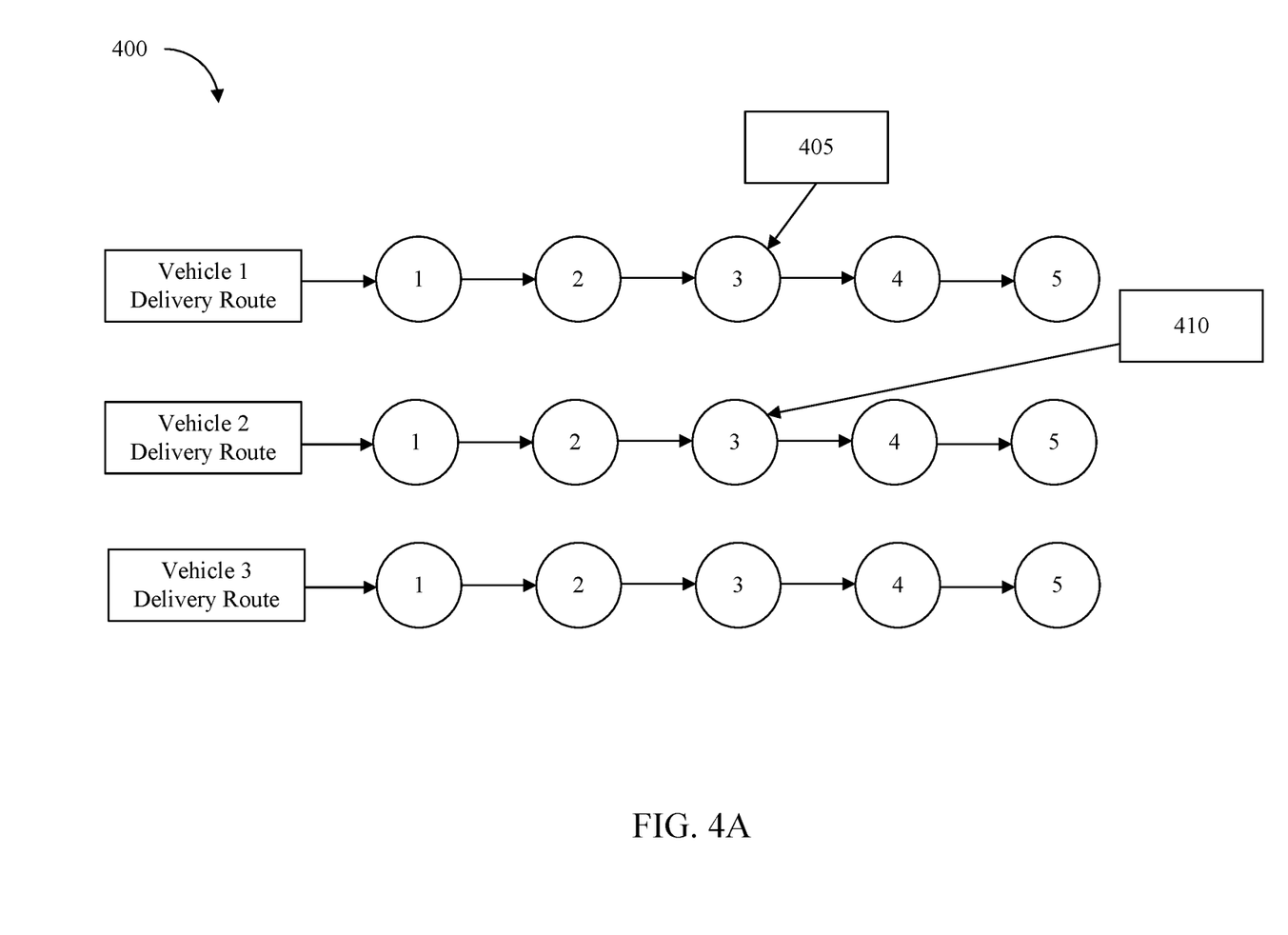
FIG. 4A illustrates an exemplary diagram of a plurality of delivery routes prior to optimization that may be used with the system shown in FIG. 1A, in accordance with some embodiments of the present disclosure.
Figure 4B:
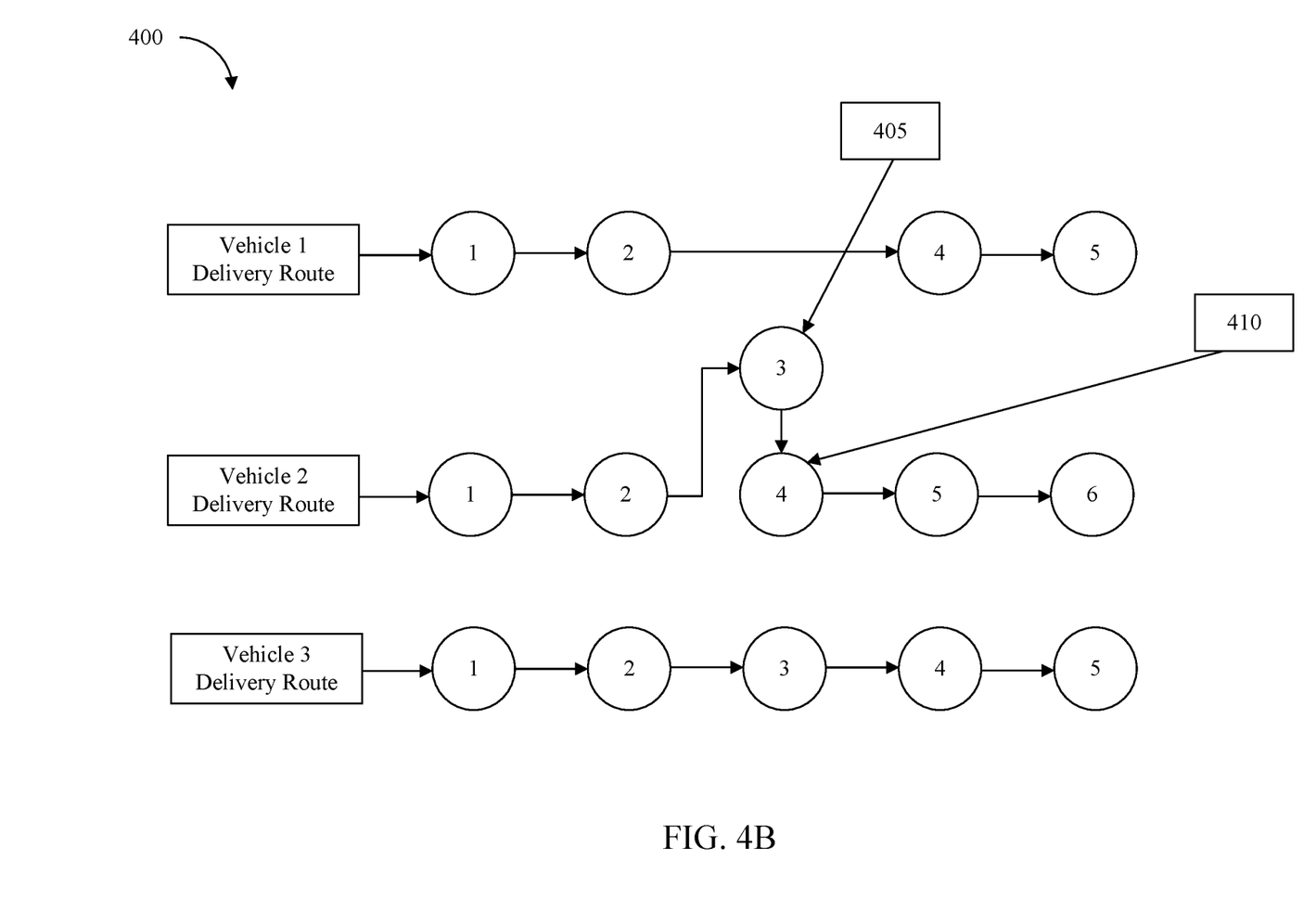
FIG. 4B illustrates an exemplary diagram of the plurality of delivery routes during optimization that may be used with the system shown in FIG. 1A, in accordance with some embodiments of the present disclosure.

FIG. 4A illustrates delivery routes for three vehicles. Server 105 may randomly select delivery order 405 corresponding to delivery number 3 in vehicle one's delivery route. Server 105 may then randomly select the time slot of delivery order 410 corresponding to delivery number 3 in vehicle two's delivery route and insert delivery order 405 into the time slot containing delivery order 410. FIG. 4B illustrates the updated delivery routes after the insertion by server 105. Server 105 may calculate the cost effect of inserting delivery order 405 into delivery order 410's slot as illustrated in FIG. 4B. More specifically, server 105 may determine the cost effect based on an increase or decrease (if any) in the total number of miles driven by each vehicle during delivery, total driving time for each vehicle during delivery, total amount of idle time for each vehicle during delivery, number of trucks needed to deliver all orders, and degree of lateness (if any) based on inserting delivery order 405 into delivery order 410's time slot. As discussed above, in some embodiments, certain factors (e.g. total mileage, degree of lateness) may have been assigned a greater weight, and therefore even relatively small increases in those factors may result in a significantly larger overall cost. Server 105 may iteratively insert delivery order 405 into one or more random time slots and calculate the cost effect of each such insertion. Server 105 may reassign delivery order 405 to the time slot resulting in the largest reduction in overall cost. If no time slot would result in a reduction of overall cost, server 105 may refrain from reassigning delivery order 405.

Referring back to FIG. 1, in some embodiments, server 105 may assign degree of lateness a relatively heavy weight, as a late delivery can result in severe consequences (e.g. easily perishable goods going bad). However, a certain degree of lateness may be tolerable if a significant improvement in one or more other parameters is achieved by an insertion. For example, if an improvement in the overall cost due to a relatively large reduction in total mileage driven by all vehicles is achieved, and the degree of lateness will not result in goods of a delivery order perishing, then server 105 may allow the insertion (if the cost effect is superior to the cost effect of other insertions).

In some embodiments, server 105 may generate an updated snapshot of time slot availability for the plurality of vehicles and store the updated snapshot in vehicle availability database 132e for presentation to online users. The updated snap shot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128a-c via vehicle server 128, which may act as a relay to provide the optimized delivery routes to the corresponding vehicles.

Figure 5:
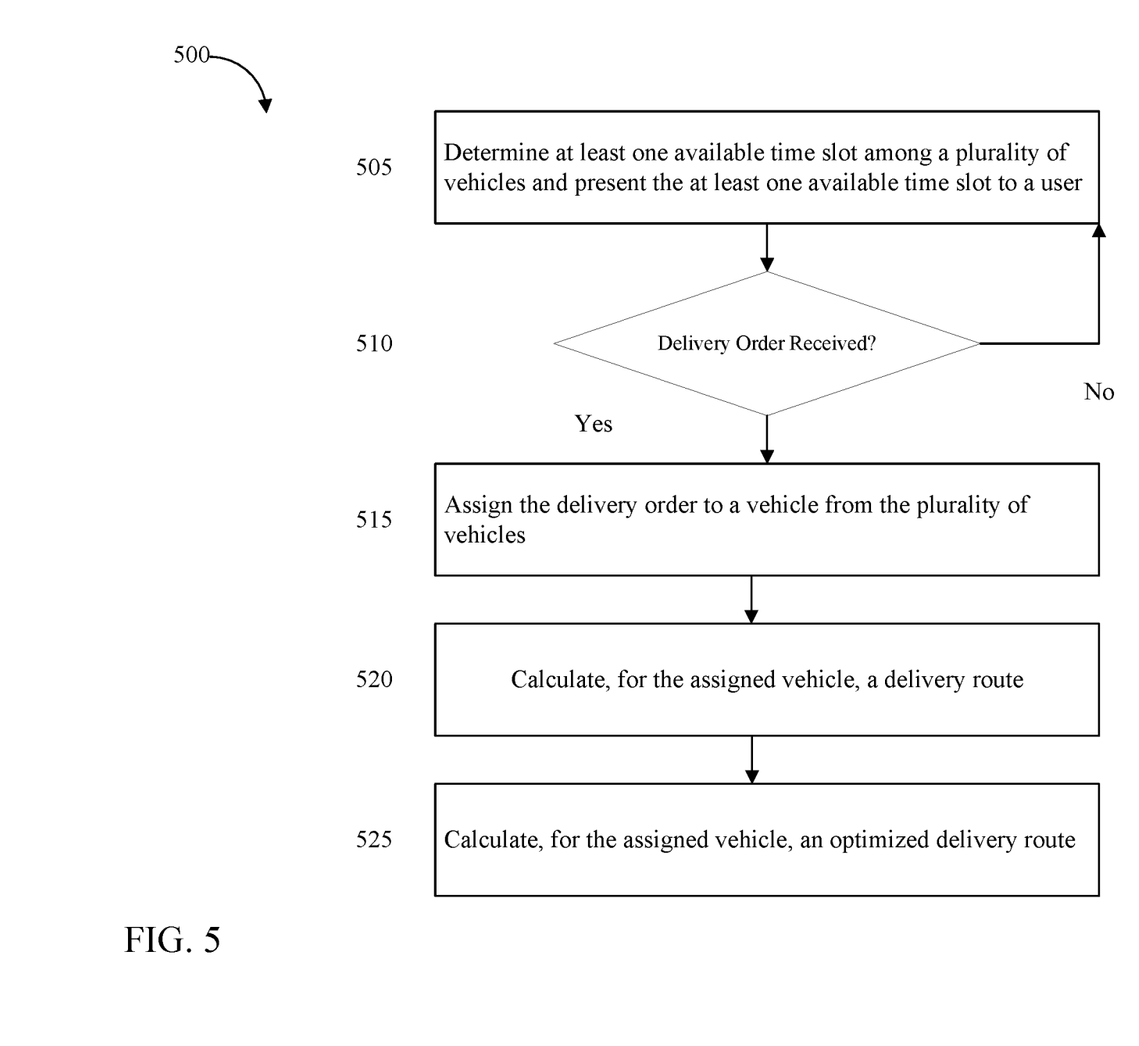
FIG. 5 illustrates a flow diagram of a method for optimizing a plurality of vehicle resources during delivery of goods using the system shown in FIG. 1A, in accordance with some embodiments of the present disclosure.

FIG. 5 illustrates a flow diagram of a method 500 for optimizing delivery vehicle resources in accordance with some exemplary embodiments of the present disclosure. Method 500 may be performed by, server 105 described with respect to FIG. 1, for example.

At 505, server 105 may determine a number of available delivery time slots and present them to a user. More specifically, server 105 may generate a synthetic order and compare the synthetic order to a snap shot of the time slot availability of the plurality of vehicles (as described above with respect to FIG. 2) retrieved from vehicle availability database 132e (shown in FIG. 1C). Server 105 may maintain the snap shot based on information received from vehicle server 128 regarding the plurality of time slots each vehicle in the plurality of vehicles has. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. At this point, server 105 may identify the time slots having at least one of the plurality of vehicles available for delivery during that time slot as acceptable delivery time slots and present them to the user via user terminals 120-130.

At 510 server 105 may determine whether a delivery order has been received. If server 105 determines that a delivery order has been received, at 515, server 105 may determine which vehicle the received delivery order is to be assigned to, and whether certain delivery orders need to be re-assigned to a different vehicle in order to optimize vehicle resources. At 520, server 105 may determine the sequence in which the assigned vehicle's delivery orders will be delivered. Server 105 may assign delivery orders to, and determine a delivery route for the vehicle based on the selected time slot of the received order, map data 132d, and an overall cost that is a function of a number of delivery parameters. In some embodiments, server 105 may also re-assign delivery orders to and determine delivery routes for other vehicles in the plurality of vehicles based on the selected time slot of the received order, map data 132d, and an overall cost that is a function of a number of delivery parameters. Examples of such delivery parameters may include number of vehicles from the plurality needed to deliver all orders, total number of miles driven by the vehicles during delivery, total driving time of the vehicles during delivery, total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

At 525, server 105 may further optimize each vehicle's delivery route. Server 105 may utilize any suitable local search algorithm, such as 1-0 exchange in order to calculate an optimized delivery route for each vehicle. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process.

In some embodiments, server 105 may generate an updated snapshot of time slot availability for the plurality of vehicles and store the updated snapshot in vehicle availability database 132*e* for presentation to online users. The updated snap shot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128*a-c* via vehicle server 128, which may act as a relay to provide the optimized delivery routes to the corresponding vehicles.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
 a computing device configured to:
  communicate with a vehicle server, wherein the vehicle server is configured to communicatively couple to a plurality of vehicles;
  receive, from the vehicle server, time data of the plurality of vehicles, wherein the time data includes a plurality of time slots for each of the plurality of vehicles that are used for a plurality of deliveries;
  determine at least one available time slot among the plurality of time slots, wherein determining the at least one available time slot comprises the computing device is configured to:
  generate a synthetic order;
  identify at least one vehicle of the plurality of vehicles having sufficient capacity to accommodate the synthetic order;
  responsive to identifying the at least one vehicle, remove time slots from the plurality of time slots based, at least in part, on an ability of the at least one vehicle to fulfill one or more previously scheduled deliveries corresponding to the at least one vehicle; and
  communicate the at least one available time slot to at least one user terminal;
  receive, from the at least one user terminal, at least one delivery order indicating at least one selected time slot from the at least one available time slot; and
  in response to receiving the at least one delivery order indicating the at least one selected time slot:
   determine a cost value with assigning the at least one delivery order to each of the plurality of vehicles based on, at least in part, the selected time indicated in the at least one delivery order, an initial delivery route to be driven by each of the plurality of vehicles, and a change in at least one delivery parameter caused by the assignment, wherein a weight is applied to the at least one delivery parameter based on a type of the at least one delivery parameter to determine the cost value, wherein the at least one delivery parameter comprises a total distance to be driven by the plurality of vehicles caused by the assignment and a degree of lateness of the at least one delivery order caused by the assignment, and wherein a first weight applied to the total distance to be driven by the plurality of vehicles is different than a second weight applied to the degree of lateness of the at least one delivery order;

determine a vehicle from the plurality of vehicles to assign the at least one delivery order to based, at least in part, on the determined cost values;

calculate, for the assigned vehicle, an optimized delivery route based, at least in part, on the at least one delivery parameter and the initial delivery route corresponding to the assigned vehicle; and transmit the optimized delivery route to the assigned vehicle.

2. The system of claim 1, wherein the at least one delivery parameter includes at least one of a number of vehicles that are being utilized from the plurality of vehicles, total mileage for each of the plurality of vehicles, total driving time for each of the plurality of vehicles, idle time for each of the plurality of vehicles, and gas requirements for each of the plurality of vehicles.

3. The system of claim 1, wherein said computing device is configured to calculate the optimized delivery route using a heuristic algorithm.

4. The system of claim 1, wherein said computing device is configured to calculate the optimized delivery route by being configured to:
select, randomly, a delivery route; and
select, randomly, a delivery order from the randomly selected delivery route.

5. The system of claim 4, wherein said computing device is configured to calculate the optimized delivery route by being configured to:
insert, iteratively, the selected delivery order into one or more time slots of the plurality of time slots for the plurality of vehicles;
calculate a cost effect for each time slot the selected delivery is inserted into;
identify a time slot having a cost effect that generates the lowest overall cost; and
insert the selected delivery order into the identified time slot having a cost effect that generates the lowest overall cost.

6. The system of claim 1, wherein said computing device is configured to calculate the optimized delivery route by using a 1-0 exchange algorithm.

7. A method comprising:
communicating with a vehicle server, wherein the vehicle server is communicatively coupled to a plurality of vehicles;
receiving, from the vehicle server, time data of the plurality of vehicles, wherein the time data includes a plurality of time slots for each of the plurality of vehicles that are used for a plurality of deliveries;

determining at least one available time slot among the plurality of time slots, wherein determining the at least one available time slot comprises:
generating a synthetic order;
identifying at least one vehicle of the plurality of vehicles having sufficient capacity to accommodate the synthetic order;
responsive to identifying the at least one vehicle, removing time slots from the plurality of time slots based, at least in part, on an ability of the at least one vehicle to fulfill one or more previously scheduled deliveries corresponding to the at least one vehicle; and
communicating the at least one available time slot to at least one user terminal;

receiving, from the at least one user terminal, at least one delivery order indicating at least one selected time slot from the at least one available time slot; and in response to receiving the at least one delivery order indicating the at least one selected time slot:
determining a cost value with assigning the at least one delivery order to each of the plurality of vehicles based on, at least in part, the selected time indicated in the at least one delivery order, an initial delivery route to be driven by each of the plurality of vehicles, and a change in at least one delivery parameter caused by the assignment, wherein a weight is applied to the at least one delivery parameter based on a type of the at least one delivery parameter to determine the cost value, wherein the at least one delivery parameter comprises a total distance to be driven by the plurality of vehicles caused by the assignment and a degree of lateness of the at least one delivery order caused by the assignment, and wherein a first weight applied to the total distance to be driven by the plurality of vehicles is different than a second weight applied to a second delivery parameter;
determining a vehicle from the plurality of vehicles to assign the at least one delivery order to based, at least in part, on the determined cost values;
calculating, for the assigned vehicle, an optimized delivery route based, at least in part, on the at least one delivery parameter and the initial delivery route corresponding to the assigned vehicle; and
transmitting the optimized delivery route to the assigned vehicle.

8. The method of claim 7, wherein the at least one delivery parameter includes at least one of a number of vehicles that are being utilized from the plurality of vehicles, total mileage for each of the plurality of vehicles, total driving time for each of the plurality of vehicles, idle time for each of the plurality of vehicles, and gas requirements for each of the plurality of vehicles.

9. The method of claim 7, wherein the optimized delivery route is calculated using a heuristic algorithm.

10. The method of claim 7, wherein calculating an optimized delivery route comprises:
selecting, randomly, a delivery route; and
selecting, randomly, a delivery order from the randomly selected delivery route.

11. The method of claim 10, wherein calculating the optimized delivery route comprises:
inserting, iteratively, the selected delivery order into one or more time slots of the plurality of time slots for the plurality of vehicles;

calculating a cost effect for each time slot the selected delivery is inserted into;

identifying a time slot having a cost effect that generates the lowest overall cost; and inserting the selected delivery order into the identified time slot having a cost effect that generates the lowest overall cost.

12. The method of claim 7, wherein the optimized delivery route is calculated using a 1-0 exchange algorithm.

13. A non-transitory computer readable medium having instructions stored thereon, wherein the instructions, when executed by a processor cause a device to perform operations comprising:

communicating with a vehicle server, wherein the vehicle server is configured to communicatively couple to a plurality of vehicles;

receiving, from the vehicle server, time data of the plurality of vehicles, wherein the time data includes a plurality of time slots for each of the plurality of vehicles that are used for a plurality of deliveries;

determining at least one available time slot among the plurality of time slots, wherein determining the at least one available time slot comprises:

generating a synthetic order;

identifying at least one vehicle of the plurality of vehicles having sufficient capacity to accommodate the synthetic order;

responsive to identifying the at least one vehicle, removing time slots from the plurality of time slots based, at least in part, on an ability of the at least one vehicle to fulfill one or more previously scheduled deliveries corresponding to the at least one vehicle; and communicating the at least one available time slot to at least one user terminal;

receiving, from the at least one user terminal, at least one delivery order indicating at least one selected time slot from the at least one available time slot; and in response to receiving the at least one delivery order indicating the at least one selected time slot:

determining a cost value with assigning the at least one delivery order to each of the plurality of vehicles based on, at least in part, the selected time indicated in the at least one delivery order, an initial delivery route to be driven by each of the plurality of vehicles, and a change in at least one delivery parameter caused by the assignment, wherein a weight is applied to the at least one delivery parameter based on a type of the at least one delivery parameter to determine the cost value, wherein the at least one delivery parameter comprises a total distance to be driven by the plurality of vehicles caused by the assignment and a degree of lateness of the at least one delivery order caused by the assignment, and wherein a first weight applied to the total distance to be driven by the plurality of vehicles is different than a second weight applied to a second delivery parameter;

determining a vehicle from the plurality of vehicles to assign the at least one delivery order to based, at least in part, on the determined cost values;

calculating, for the assigned vehicle, an optimized delivery route based, at least in part, on the at least one delivery parameter and the initial delivery route corresponding to the assigned vehicle; and transmitting the optimized delivery route to the assigned vehicle.

14. The non-transitory computer readable medium of claim 13, wherein the at least one delivery parameter includes at least one of a number of vehicles that are being utilized from the plurality of vehicles, total mileage for each of the plurality of vehicles, total driving time for each of the plurality of vehicles, idle time for each of the plurality of vehicles, and gas requirements for each of the plurality of vehicles.

15. The non-transitory computer readable medium of claim 13, wherein the optimized delivery route is calculated using a heuristic algorithm.

16. The non-transitory computer readable medium of claim 13, wherein calculating an optimized delivery route comprises:

selecting, randomly, a delivery route; and selecting, randomly, a delivery order from the randomly selected delivery route.

17. The non-transitory computer readable medium of claim 16, wherein calculating the optimized delivery route comprises:

inserting, iteratively, the selected delivery order into one or more time slots of the plurality of time slots for the plurality of vehicles;

calculating a cost effect for each time slot the selected delivery is inserted into;

identifying a time slot having a cost effect that generates the lowest overall cost; and inserting the selected delivery order into the identified time slot having a cost effect that generates the lowest overall cost.

* * * * *

UNITED STATES PATENT AND TRADEMARK OFFICE
CERTIFICATE OF CORRECTION

PATENT NO. : 11,475,395 B2  
APPLICATION NO. : 15/876007  
DATED : October 18, 2022  
INVENTOR(S) : Anurag Gupta et al.

Page 1 of 1

It is certified that error appears in the above-identified patent and that said Letters Patent is hereby corrected as shown below:

On the Title Page

Column 1, (72) Inventors:  
Deepak Deshpande should read --Deepak Ramesh Deshpande--

Signed and Sealed this  
Twenty-second Day of November, 2022

Katherine Kelly Vidal  
*Director of the United States Patent and Trademark Office*